United States Patent
Murphy et al.

(10) Patent No.: US 10,309,431 B2
(45) Date of Patent: Jun. 4, 2019

(54) METHODS AND APPARATUS TO CONTROL MOVEMENT OF A COMPONENT

(71) Applicant: The Boeing Company, Chicago, IL (US)

(72) Inventors: Robert M. Murphy, Everett, WA (US); Kelly T. Jones, Snohomish, WA (US); Robert E. Fisher, Everett, WA (US); Mark J. Gardner, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 421 days.

(21) Appl. No.: 15/096,924

(22) Filed: Apr. 12, 2016

(65) Prior Publication Data

US 2016/0222994 A1 Aug. 4, 2016

Related U.S. Application Data

(63) Continuation of application No. 13/566,807, filed on Aug. 3, 2012, now abandoned.

(51) Int. Cl.
*F16F 9/20* (2006.01)
*B64C 13/40* (2006.01)
(Continued)

(52) U.S. Cl.
CPC .............. *F15B 15/22* (2013.01); *B64C 13/40* (2013.01); *B64D 45/00* (2013.01); *F15B 15/00* (2013.01);
(Continued)

(58) Field of Classification Search
CPC .......... F15B 15/26; F15B 15/22; F15B 15/28; F15B 15/149; F15B 15/00; B64D 45/00;
(Continued)

(56) References Cited

U.S. PATENT DOCUMENTS 2,990,141 A 6/1961 Wallis
3,592,236 A 7/1971 Meulendyk
(Continued)

FOREIGN PATENT DOCUMENTS

| CN | 1914426 | 2/2007 |
| CN | 101983289 | 3/2011 |
| CN | 102226453 | 10/2011 |

OTHER PUBLICATIONS

State Intellectual Property Office, "Fourth Office Action," issued in connection with Chinese Patent Application No. 201310331770.X, dated May 3, 2018, 6 pages.
(Continued)

*Primary Examiner* — F Daniel Lopez
*Assistant Examiner* — Dustin T Nguyen
(74) *Attorney, Agent, or Firm* — Hanley, Flight & Zimmerman, LLC

(57) ABSTRACT

Methods and apparatus to control movement of a component are disclosed herein. An example apparatus includes a housing defining a bore and a piston disposed inside the bore. The piston is to be coupled to a movable component disposed outside of the bore. The example apparatus further includes a fluid flowline in fluid communication with a first chamber of the bore and a second chamber of the bore. The first chamber is on a first side of the piston, and the second chamber on a second side of the piston. The example apparatus also includes a valve to control fluid flow through the fluid flowline. The valve is to be in a first state to enable the piston to dampen movement of the component, and the valve is to be in a second state to enable the piston to hold the component substantially stationary.

20 Claims, 8 Drawing Sheets

(51) Int. Cl.
*B64D 45/00* (2006.01)
*F15B 15/00* (2006.01)
*F15B 15/22* (2006.01)
*F16F 9/46* (2006.01)
*F16F 9/56* (2006.01)
*F15B 15/14* (2006.01)
*F15B 15/28* (2006.01)

(52) U.S. Cl.
CPC ............ *F15B 15/149* (2013.01); *F15B 15/28* (2013.01); *F16F 9/20* (2013.01); *F16F 9/46* (2013.01); *F16F 9/56* (2013.01); *B64D 2045/0085* (2013.01)

(58) Field of Classification Search
CPC ............ B64D 2045/0085; B64C 13/40; B64C 13/504; B64C 13/42; B64C 13/44; B64C 13/46; B64C 13/50; B64C 13/503; B64C 13/505; B64C 13/506; B64C 13/507; F46F 9/20; F46F 9/56
USPC ...... 91/27; 73/1.68; 244/78.1; 340/945–983; 702/114; 701/29.1–34.4
See application file for complete search history.

(56) References Cited

U.S. PATENT DOCUMENTS

| | | | |
|---|---|---|---|
| 4,625,513 A | 12/1986 | Glomeau | |
| 4,630,441 A | 12/1986 | Chamberlain | |
| 5,098,043 A | 3/1992 | Arena | |
| 5,144,801 A | 9/1992 | Scanderbeg et al. | |
| 6,081,231 A * | 6/2000 | Evans | G01S 5/0027 342/357.75 |
| 6,578,425 B2 * | 6/2003 | Hickman | B64C 13/40 73/716 |
| 6,625,982 B2 | 9/2003 | Van Den Bossche et al. | |
| 6,796,120 B2 | 9/2004 | Franchet et al. | |
| 6,799,739 B1 * | 10/2004 | Jones | B64C 13/40 244/10 |
| 6,979,185 B2 | 12/2005 | Kaempe | |
| 7,143,875 B2 * | 12/2006 | Matsunaga | B60G 17/0152 188/266.5 |
| 7,168,313 B2 | 1/2007 | Reinis et al. | |
| 7,191,593 B1 | 3/2007 | Ho | |
| 7,207,579 B1 | 4/2007 | Howard | |
| 7,207,580 B2 | 4/2007 | Howard | |
| 7,600,825 B2 | 10/2009 | Ziegler | |
| 7,836,817 B2 | 11/2010 | Tokumoto | |
| 7,909,415 B2 | 3/2011 | Weber et al. | |
| 7,942,394 B2 | 5/2011 | Moncavage | |
| 8,720,197 B2 | 5/2014 | Persson et al. | |
| 8,876,045 B2 | 11/2014 | Ito et al. | |
| 9,108,715 B2 | 8/2015 | Kordel et al. | |
| 9,352,759 B2 | 5/2016 | Ogawa | |
| 2003/0127569 A1 * | 7/2003 | Bacon | B64C 13/503 244/195 |
| 2006/0071542 A1 | 4/2006 | Lichtensteiger et al. | |
| 2007/0124038 A1 * | 5/2007 | Goupil | G05B 23/0254 701/31.1 |
| 2011/0030364 A1 | 2/2011 | Persson et al. | |
| 2011/0060569 A1 * | 3/2011 | Lynn | G06F 11/0739 703/6 |
| 2011/0063136 A1 * | 3/2011 | Fabas | G08B 25/006 340/963 |
| 2011/0192157 A1 | 8/2011 | Ogawa | |
| 2011/0256000 A1 * | 10/2011 | Fukui | F04B 49/002 417/213 |
| 2012/0025015 A1 * | 2/2012 | Ito | B64C 13/40 244/99.6 |
| 2012/0029859 A1 * | 2/2012 | Fukui | B64C 13/40 702/114 |

OTHER PUBLICATIONS

State Intellectual Property Office of China, "Second Office Action," issued in connection with Chinese Patent Application No. 201310331770X, dated Apr. 13, 2017, 14 pages.
United States Patent and Trademark Office, "Non-Final Rejection," issued in connection with U.S. Appl. No. 13/566,807 dated Jul. 29, 2015, 27 pages.
United States Patent and Trademark Office, "Non-Final Rejection," issued in connection with U.S. Appl. No. 13/566,807 dated Dec. 5, 2014, 13 pages.
United States Patent and Trademark Office, "Final Rejection," issued in connection with U.S. Appl. No. 13/566,807 dated Apr. 23, 2015, 27 pages.
United States Patent and Trademark Office, "Final Rejection," issued in connection with U.S. Appl. No. 13/566,807 dated Feb. 1, 2016, 22 pages.
State Intellectual Property Office of China, "First Office Action," issued in connection with Chinese Patent Application No. 201310331770.X, dated Aug. 3, 2016, 15 pages.
State Intellectual Property Office, "Fifth Office Action," issued in connection with Chinese Patent Application No. 201310331770.X, dated Nov. 7, 2018, 16 pages.
Canadian Intellectual Property Office, "Notification of a Requisition by the Examiner in Accordance with Subsection 30(2) of the Patent Rules", issued in connection with Canadian Application No. 2,815,502 dated Jan. 17, 2019, 3 pages.

* cited by examiner

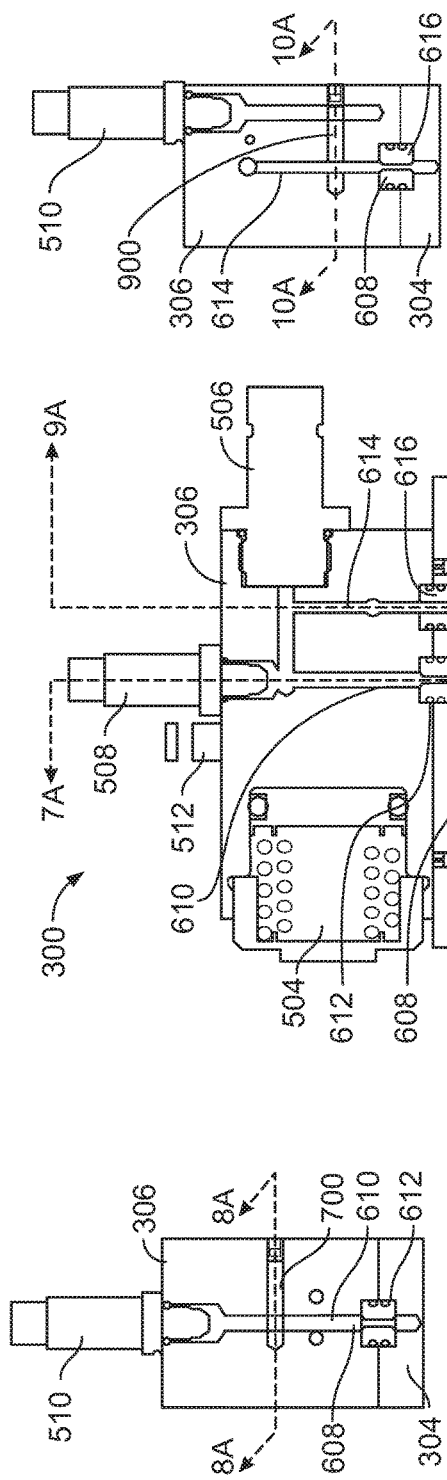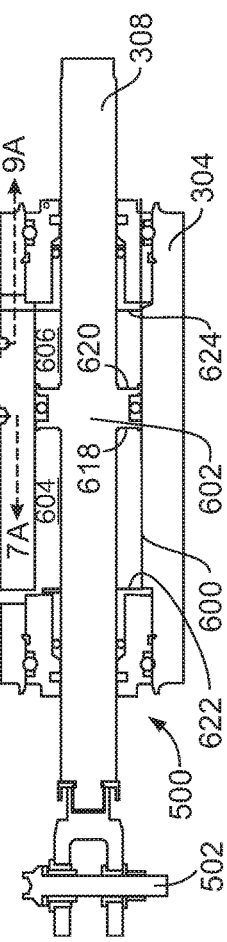

METHODS AND APPARATUS TO CONTROL MOVEMENT OF A COMPONENT

RELATED APPLICATION

This patent arises from a continuation of U.S. application Ser. No. 13/566,807, titled "Methods and Apparatus to Control Movement of a Component," filed Aug. 3, 2012, which is incorporated herein by reference in its entirety.

STATEMENT REGARDING FEDERALLY SPONSORED RESEARCH OR DEVELOPMENT

This disclosure was made with Government support under Contract No. OTA DFTAWA-10-C-00030 awarded by the Federal Aviation Administration. The Government of the United States may have certain rights in this disclosure.

FIELD

The present disclosure relates generally to movable components and, more particularly, to methods and apparatus to control movement of a component.

BACKGROUND

Generally, an aircraft includes flaps to adjust aerodynamics of the aircraft. A position of a flap may be adjusted by an actuator coupled to the flap. During flight, the flap is subjected to a variety of loads from the actuator and passing air.

SUMMARY

An example apparatus includes a housing defining a bore and a piston disposed inside the bore. The piston is to be coupled to a movable component disposed outside of the bore. The example apparatus further includes a fluid flowline in fluid communication with a first chamber of the bore and a second chamber of the bore. The first chamber is on a first side of the piston, and the second chamber on a second side of the piston. The example apparatus also includes a valve to control fluid flow through the fluid flowline. The valve is to be in a first state to enable the piston to dampen movement of the component, and the valve is to be in a second state to enable the piston to hold the component substantially stationary.

Another example apparatus includes a housing and a piston disposed in a bore defined by the housing. A first side of the piston defines a first end of a fluid flow path, and a second side of the piston defines a second end of the fluid flow path. The piston is to be coupled to a movable component disposed outside of the bore. The example apparatus further includes a valve disposed along the fluid flow path. The valve is to be in a first state to enable the piston to be driven along the bore by the component, and the valve is to be in a second state to prevent the piston from being driven along the bore by the component.

Another example apparatus includes a hydraulic piston assembly including a housing defining a bore. The example apparatus further includes a dual-acting piston disposed in the bore. The piston is to be coupled to a movable component disposed outside of the bore such that movement of the component is to drive the piston along the bore. The example apparatus also includes a valve to control fluid employed via the hydraulic piston assembly. The valve is to be in a first state to enable to the piston to displace the fluid, and the valve is to be in a second state to lock the piston in place.

The features, functions and advantages that have been discussed can be achieved independently in various examples or may be combined in yet other examples further details of which can be seen with reference to the following description and drawings.

BRIEF DESCRIPTION OF THE DRAWINGS

FIG. 6 is a cross-sectional view of the example apparatus of FIG. 5 in which a valve is in a first state.

FIGS. 7-11 are another cross-sectional views of the example apparatus of FIG. 5.

Figure 1:
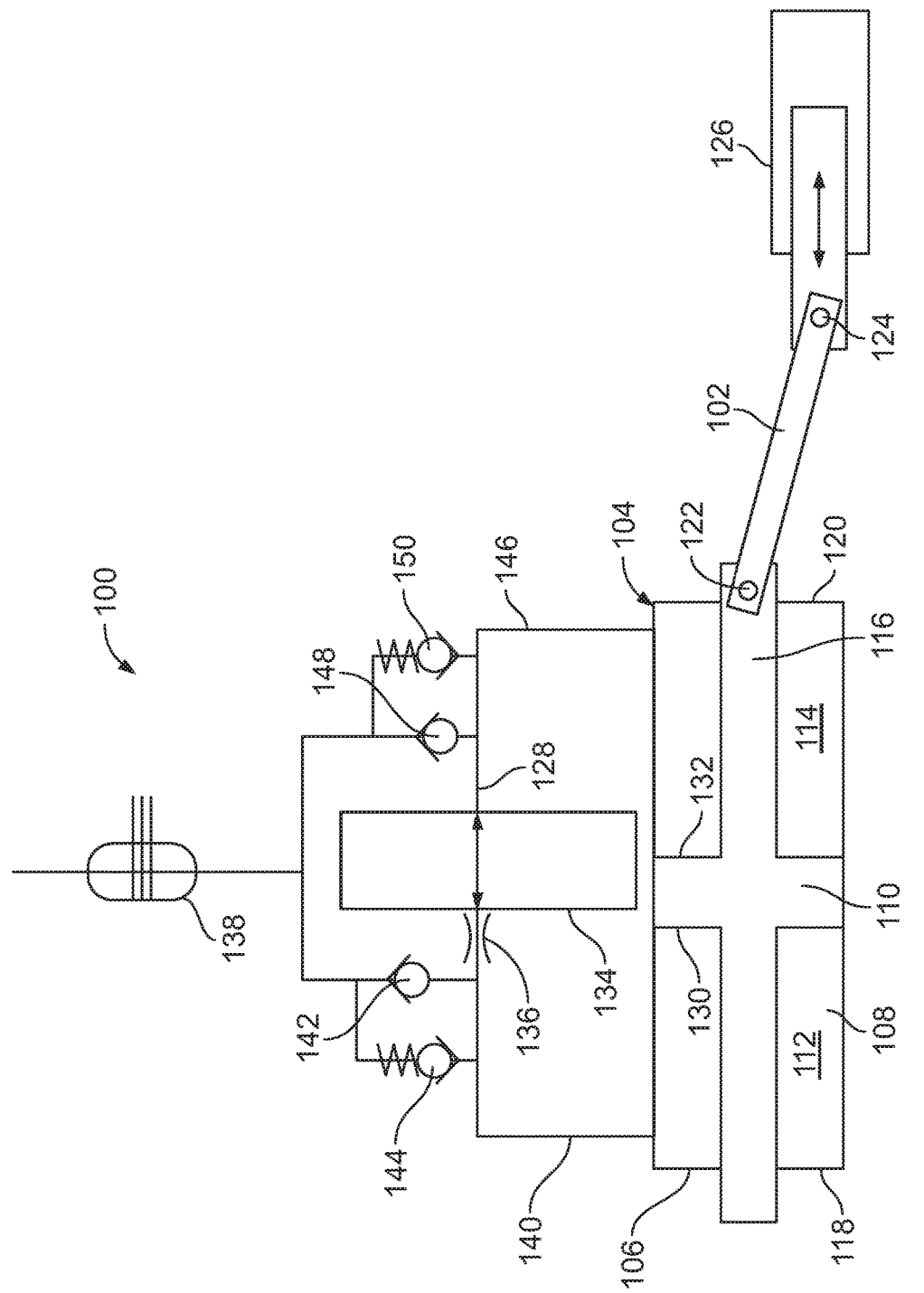
FIG. 1 is a schematic of an example apparatus disclosed herein coupled to a movable component.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above or below the other part with one or more intermediate part(s) located therebetween. Stating that any part is in contact with another part means that there is no intermediate part between the two parts.

DESCRIPTION

The example methods and apparatus disclosed herein may be used to control movement of a movable component. The component may be subjected to a variety of forces (e.g., via an actuator, airflow, etc.). In some examples, if not controlled, the component may vibrate or flutter in response to the forces. The example apparatus and methods disclosed herein may be used to enable movement of the component (e.g., toward a desired position) while damping the movement of the component (e.g., to reduce vibratory motion). The example methods and apparatus may also be used to lock the component in place (e.g., in a desired position).

FIG. 1 is a schematic of an example apparatus 100 disclosed herein, which may be used to control movement of a component 102. The example apparatus 100 of FIG. 1 includes a piston assembly 104 (e.g., a non-differential cylinder). The piston assembly 104 includes a housing 106 defining a bore 108. A piston 110 is disposed in the example bore 108 such that the piston 110 and the bore 108 define a first chamber 112 on a first side of the piston 110 and a second chamber 114 on a second side of the piston 110. An arm 116 is coupled to the example piston 110. In the illustrated example, the arm 116 extends through a first end 118 of the housing 106 and a second end 120 of the housing 106.

The component 102 (e.g., a link) is disposed outside of the housing 106. A first end 122 of the component 102 is coupled to the arm 116, and a second end 124 of the component 102 is coupled to an actuator 126. During operation of the actuator 126, the actuator 126 applies a force or torque to the component 102 to move the component 102 along a given path. When the example component 102 moves along the given path, the component 102 drives the piston 110 along the bore 108.

The example apparatus 100 provides a closed fluid flow path. In the illustrated example, the fluid path is defined by the first chamber 112, a flowline 128 and the second chamber 114. The example flowline 128 is in fluid communication with the first chamber 112 and the second chamber 114. Thus, a first end of the example fluid path is defined by a first side 130 of the piston 110, and a second end of the example fluid path is defined by a second side 132 of the piston 110. During operation, the example fluid path (i.e., the first chamber 112, the flowline 128, and the second chamber 114) is substantially filled with a fluid.

In the illustrated example, movement of the example piston 110 in a first direction (e.g., to the left in the orientation of FIG. 1) displaces the fluid from the first chamber 112 into the flowline 128 (i.e., the fluid moves clockwise around the fluid path). Movement of the example piston 110 in a second direction (e.g., to the right in the orientation of FIG. 1.) displaces the fluid from the second chamber 114 into the flowline 128 (i.e., the fluid moves counterclockwise around the fluid path). Thus, the example piston 110 is a double-acting piston (i.e., movement of the piston 110 in the first direction displaces the fluid on the first side 130 of the piston 110, and movement of the piston 110 in the second direction displaces the fluid on the second side 132 of the piston 110). When the fluid is displaced from one of the first chamber 112 or the second chamber 114 into the flowline 128, the fluid in the flowline 128 flows into the other one of the first chamber 112 or the second chamber 114.

A valve 134 is disposed along the flowline 128 to control the fluid employed via the example piston assembly 104. In the illustrated example, when the valve 134 is in a first state (e.g., an open state), the valve 134 enables the fluid to move past the valve 134, thereby enabling the piston 110 to move along the bore 108. In the illustrated example, an orifice 136 is in fluid communication with the flowline 128 to provide resistance to the fluid flow as the fluid flows through the flowline 128. As a result, when the valve 134 is in the first state, the valve 134 enables the fluid to dampen movement (e.g., vibrations) of the component 102 via the piston 110. While the example of FIG. 1 depicts a separate orifice or restriction (i.e., the orifice 136), in some examples, separate restrictions may not be included and the valve 134 provides resistance or restriction to the fluid flow.

When the valve 134 is in a second state (e.g., a closed state), the valve 134 prevents (e.g., blocks) the fluid from flowing past the valve 134 along the flowline 128. As a result, fluid in the first chamber 112 or the second chamber 114 cannot be displaced into the flowline 128, thereby substantially preventing the piston 110 from moving (e.g., being driven) along the bore 108. Thus, when the valve 134 is in the second state, the piston assembly 104 locks the component 102 in place (i.e., the piston 110 and the arm 116 hold the component 102 substantially stationary).

In the illustrated example, the first chamber 112 and the second chamber 114 are fluidly coupled to a fluid reservoir 138 (e.g., an accumulator). The example fluid reservoir 138 enables the example apparatus 100 to maintain fluid pressures between a lower limit and an upper limit. A first portion 140 of the example flowline 128 is in fluid communication with the first chamber 112 and the fluid reservoir 138 via a first check valve 142 and a first relief valve 144. In the illustrated example, the first portion 140 of the example flowline 128 is between the first chamber 112 and the valve 134. A second portion 146 of the example flowline 128 is in fluid communication with the fluid reservoir 138 via a second check valve 148 and a second relief valve 150. In the illustrated example, the second portion 146 of the flowline 128 provides the fluid path is between the second chamber 114 and the valve 134.

In the illustrated example, the first relief valve 144 is substantially identical to the second relief valve 150, and the first check valve 142 is substantially identical to the second check valve 148. Therefore, a description of the first relief valve 144 and the first check valve 142 can be equally applied to the second relief valve 150 and the second check valve 148, respectively. Thus, to avoid redundancy, the second relief valve 150 and the second check valve 148 are not separately described.

When a pressure of the fluid in the first chamber 112 and/or the first portion 140 of the flowline 128 reaches an upper limit due to an increase in temperature and, thus, volume of the fluid, the first relief valve 144 (e.g., a thermal relief valve) opens to enable the fluid in the first chamber 112 and/or the first portion 140 of the flowline 128 to flow into the fluid reservoir 138. However, the first relief valve 144 does not open in response to pressures in the first chamber 112 and/or the first portion 140 of the flowline 128 caused by forces applied to the piston 110 by the component 102. When the pressure in the first portion 140 of the flowline 128 decreases below a lower limit (e.g., as a result of a decrease in volume of the fluid and/or a decrease in an amount of fluid in the first chamber 112 and/or the first portion 140 of the flowline 128), the first check valve 142 opens to enable fluid from the fluid reservoir 138 to flow into the first portion 140 of the flowline 128 and/or the first chamber 112. Thus, the example apparatus 100 adapts to changes in the volume and/or the amount of the fluid in the piston assembly 104 to maintain the fluid pressures in the first chamber 112, the second chamber 114 and the flowline 128 between the upper limit (e.g., 3000 pounds per square inch) and the lower limit (e.g., 30 pounds per square inch).

Figure 2:
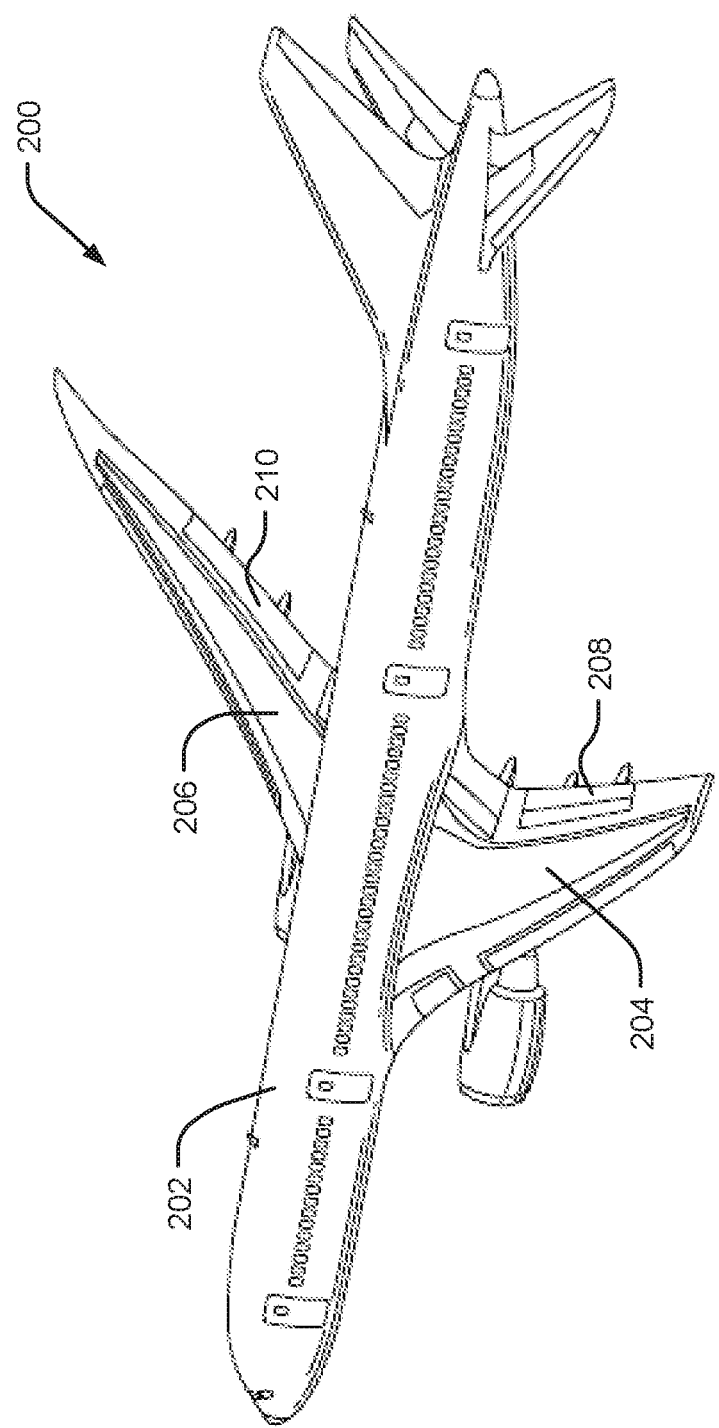
FIG. 2 illustrates an example aircraft that may be used to implement the examples disclosed herein.

FIG. 2 is an aircraft 200 in which aspects of the present disclosure may be implemented. In the illustrated example, the aircraft 200 includes a fuselage 202 and a first wing 204 and a second wing 206. The example first wing 204 includes a first flap 208, and the example second wing 206 includes a second flap 210. The first flap 208 and the second flap 210 are operatively coupled to respective actuators such as, for example, a hinge line rotary actuator described in U.S. application Ser. No. 13/455,852, filed on Apr. 25, 2012, which is hereby incorporated herein by reference in its entirety. In some examples, the actuators adjust positions of the first flap 208 and the second flap 210.

Figure 3:
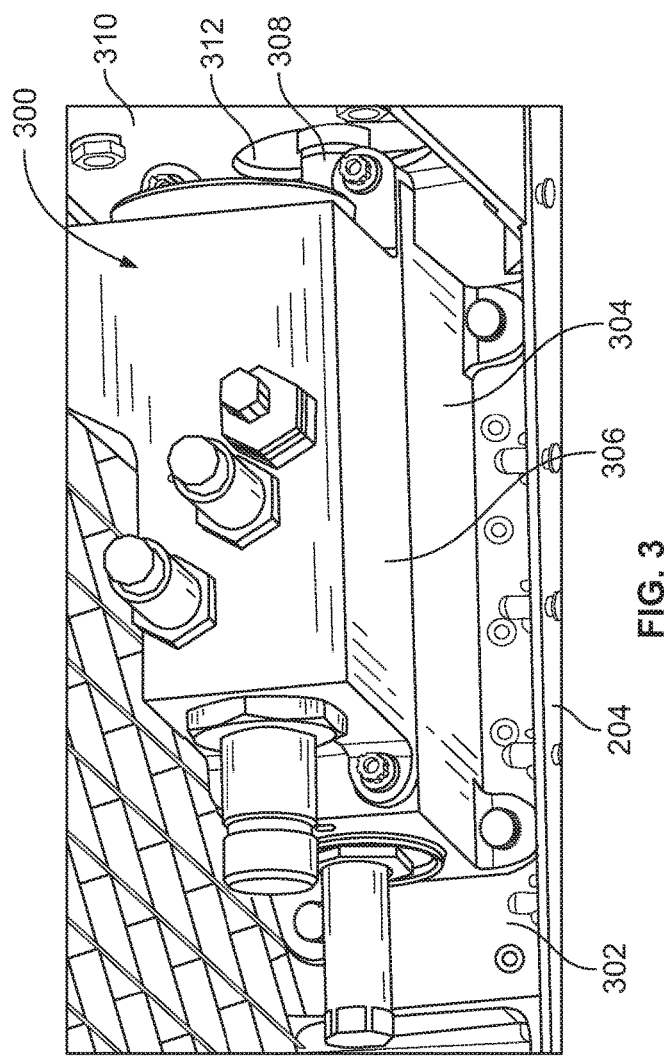
FIG. 3 illustrates an example apparatus coupled to a wing of the example aircraft of FIG. 2.

FIG. 3 illustrates an example apparatus 300 disclosed herein. The example apparatus 300 of FIG. 3 is coupled to a cord rib 302 of the first wing 204 of the example aircraft 200 of FIG. 2. The example apparatus 300 includes a first housing 304 and a second housing 306. In the illustrated example, the first housing 304 is coupled to the cord rib 302. In other examples, the apparatus 300 is coupled to another portion of the aircraft 200. An arm 308 of the example apparatus 300 extends through the first housing 304. In the illustrated example, a spar 310 of the first wing 204 defines an aperture 312 through which the arm 308 is coupled to the first flap 208 (FIG. 4).

Figure 4:
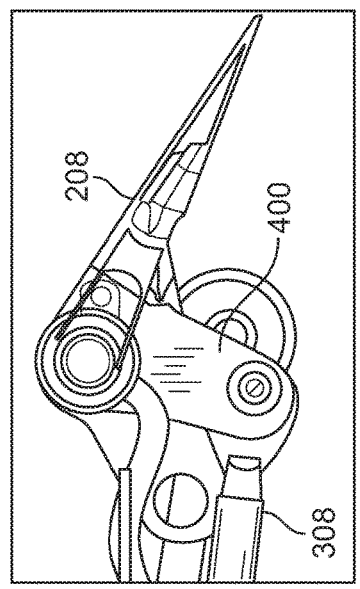
FIG. 4 illustrates an arm of the example apparatus of FIG. 3. coupled to a flap of the wing of the example aircraft of FIG. 2.

FIG. 4 is a cross-sectional view of the first flap 208 of the example aircraft 200 of FIG. 2. In the illustrated example, the arm 308 of the example apparatus 300 is coupled to the first flap 208 via a link 400. When the example first flap 208 is rotated (e.g., via the actuator), the arm 308 is driven by the link 400. As described in greater detail below, the example apparatus 300 dampens movement of the first flap 208 and may be used to hold the first flap 208 substantially stationary (i.e., lock the first flap 208 in place).

Figure 5:
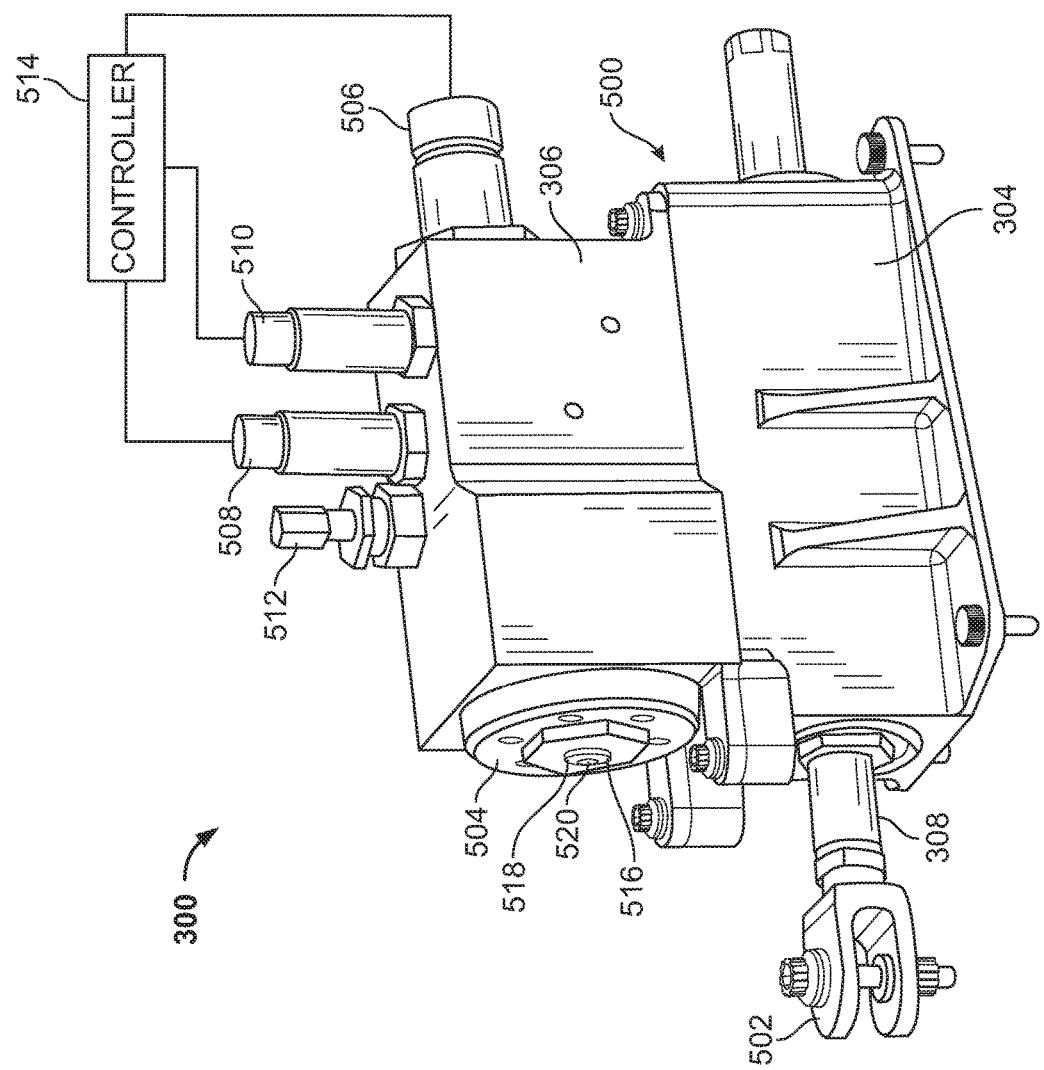
FIG. 5 is a perspective view of the example apparatus of FIGS. 3-4.

FIG. 5 is a perspective view of the example apparatus 300 of FIG. 3. In the illustrated example, the apparatus 300 includes a hydraulic piston assembly 500 including the first housing 304 and the arm 308. The example arm 308 includes a coupling 502 (e.g., a clevis). In the illustrated example, the second housing 306 is coupled to the first housing 304. The example second housing 306 includes an accumulator 504, a valve 506 (e.g., a solenoid), a first pressure sensor 508, a second pressure sensor 510 and a port 512. The valve 506, the first pressure sensor 508 and the second pressure sensor 510 are communicatively coupled to a controller 514. As described in greater detail below, the controller 514 controls a state of the example valve 506 and monitors fluid pressures determined via the first pressure sensor 508 and the second pressure sensor 510.

The example accumulator 504 is a spring-type accumulator, and a tip 516 of a piston rod 518 of the accumulator 504 extends outside of the second housing 306. Other examples include other types of accumulators (e.g., gas-filled accumulators, gas filled/spring accumulators, etc.). In some examples, the piston rod 518 includes a visual indicator 520 (e.g., the tip is colored red) to indicate a fluid level of the accumulator 504. If the visual indicator 520 is disposed outside of the second housing 306 and, thus, visible, the fluid level of the accumulator 504 is above a threshold level. If the visual indicator 520 is not disposed outside of the second housing 306, the fluid level of the accumulator 504 is below the threshold level. Thus, the fluid level of the example accumulator 504 may be determined by visual inspection. In the illustrated example, fluid employed by the example apparatus 300 is initially provided via the example port 512.

FIGS. 6-11 are cross-sectional views of the example apparatus 300 of FIGS. 3-5. As illustrated in FIG. 6, the example first housing 304 defines a bore 600. In the illustrated example, a piston 602 is disposed in the example bore 600 such that the piston 602 and the bore 600 define a first chamber 604 on a first side of the piston 602, and a second chamber 606 on a second side of the piston 602. The example arm 308 is coupled to the piston 602. Thus, movement of the first flap 208 drives the piston 602 along the bore 600.

In the illustrated example, a flowline 608 is in fluid communication with the first chamber 604 and the second chamber 606. A first portion 610 of the example flowline 608 extends from the first chamber 604 of the bore 600 into the second housing 306 via a first transfer tube 612. The first portion 610 of the example flowline 608 is in fluid communication with the first pressure sensor 508 and the valve 506. In the illustrated example, the valve 506 is in a first state in which the valve 506 enables fluid in the flowline 608 to flow past the valve 506. As described in greater detail below,
when the valve 506 is in the first state, the valve 506 enables the piston 602 to move along the bore 600.

FIG. 7 is a cross-sectional view of the example apparatus 300 of FIG. 6 taken along line 7A-7A. In the illustrated example, the first portion 610 of the example flowline 608 includes a first passage 700 to fluidly couple the first portion 610 of the flowline 608 to the accumulator 504.

FIG. 8 is a cross-sectional view of the example apparatus 300 of FIGS. 6-7 view taken along line 8A-8A. In the illustrated example, the first passage 700 is fluidly coupled to the accumulator 504 via a first relief valve 800 and a first check valve 802. In the illustrated example, the first relief valve 800 is disposed in a first branch 804 of the first passage 700. The first check valve 802 is disposed in a second branch 806 of the first passage 700.

Returning to FIG. 6, a second portion 614 of the example flowline 608 extends from the second chamber 606 of the bore 600 into the second housing 306 via a second transfer tube 616. Inside the second housing 306, the second portion 614 of the example flowline 608 is in fluid communication with the valve 506 and the second portion 614 of the example flowline 608.

FIG. 9 is a cross-sectional view of the example apparatus 300 of FIG. 6 taken along line 9A-9A. As illustrated in FIG. 9, the example second portion 614 of the flowline 608 is fluidly coupled to the second pressure sensor 510 via a second passage 900.

FIG. 10 is a cross-sectional view of the example apparatus 300 of FIG. 9 taken along line 10A-10A. In the illustrated example, the second passage 900 of the flowline 608 is fluidly coupled to the accumulator 504 via a second relief valve 1000 and a second check valve 1002. Thus, the first portion 610 of the example flowline 608 and the second portion 614 of the example flowline 608 are separately fluidly coupled to the accumulator 504. In the illustrated example, the second relief valve 1000 is disposed in a third branch 1004 of the second passage 900. The second check valve 1002 is disposed in a fourth branch 1005 of the second passage 900.

Returning again to FIG. 6, when the example valve 506 is in the first state (e.g., an open state), the valve 506 enables the fluid to flow through the flowline 608, thereby enabling the piston 602 to move along the bore 600. For example, when the piston 602 moves along the bore 600, the piston 602 displaces the fluid in one of the first chamber 604 or the second chamber 606 into the flowline 608, and the fluid in the flowline 608 flows into the other one of the first chamber 604 or the second chamber 606. Thus, the apparatus 300 provides a closed fluid path. A first end of the fluid path is defined by the first side 618 of the piston 602, and a second end of the fluid path is defined by the second side 620 of the piston 602. Thus, the example piston 602 is a dual-acting piston.

Because the valve 506 is disposed along the flowline 608, the valve 506 provides a resistance to the flow of the fluid (e.g., corresponding to about 95 Lohms) as movement of the piston 602 causes the fluid to flow past the valve 506. As a result, when the valve 506 is in the first state, the fluid dampens movement (e.g., vibrations) of the first flap 208 via the piston 602, thereby reducing any vibratory movement and/or fluttering of the first flap 208. In some examples, a flow restriction and/or an orifice is disposed along the flowline 608 to provide resistance to the fluid flow.

In some examples, the hydraulic piston assembly 500 includes a first stop 622 and a second stop 624 disposed along a path of the piston 602. In the illustrated example, a first end of the bore 600 and a second end of the bore 600 provide the first stop 622 and the second stop 624, respectively. Thus, if the first flap 208 moves the piston 602 a threshold amount in the first direction, the piston 602 contacts the first stop 622, thereby preventing further movement of the first flap 208 in the first direction. If the first flap 208 moves the piston 602 a threshold amount in the second direction, the piston 602 contacts the second stop 624, thereby preventing further movement of the first flap 208 in the second direction. Other examples include other stops (e.g., stops disposed outside of the bore 600 and/or the first housing 304).

Figure 11:
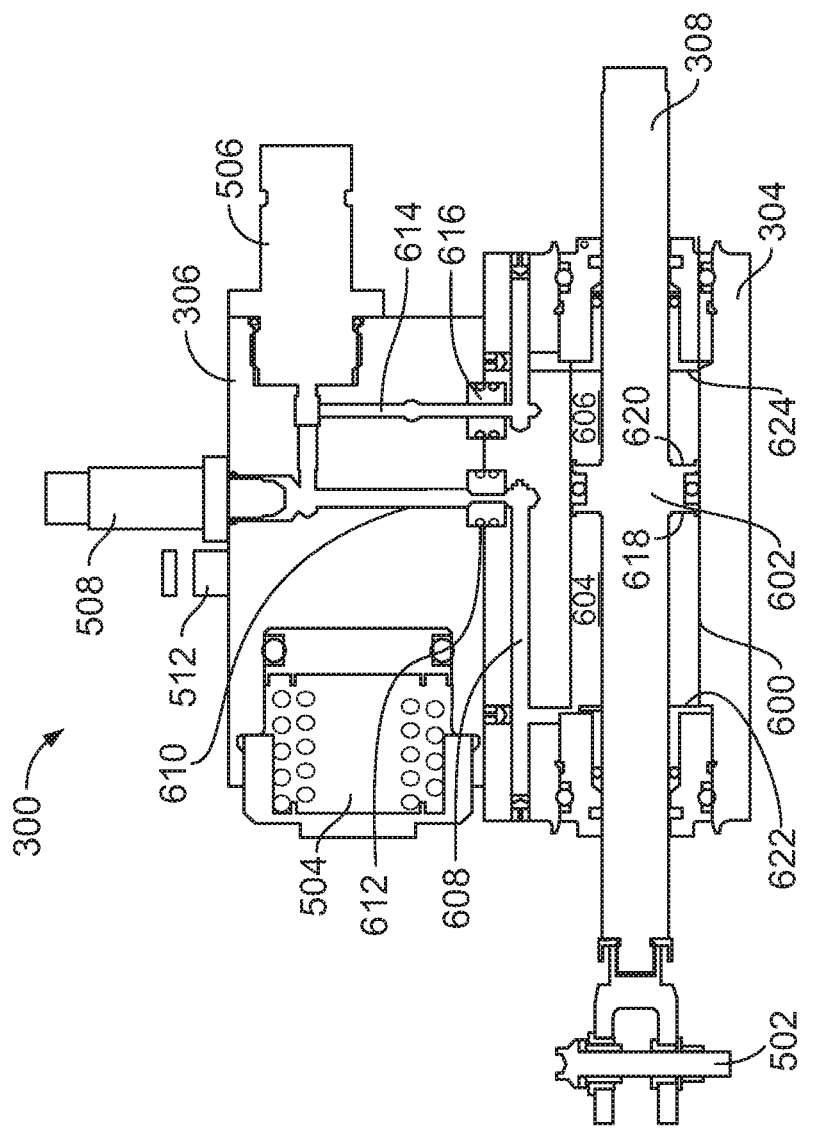

FIG. 11 illustrates the example apparatus 300 when the valve 506 is in a second state (e.g., a closed state). In some examples, when the example first flap 208 is moved to a desired position, the example controller 514 sends a signal to the valve 506 to actuate the valve 506 to the second state to lock the first flap 208 in the desired position. In some examples, the controller 514 sends a signal to the valve 506 to actuate the valve 506 to the second state if the first flap 208 moves to a threshold position and/or if a position of the first flap 208 does not correspond to a commanded position. When the valve 506 is in the second state, the valve 506 prevents (e.g., blocks) the fluid from flowing past the valve 506 along the flowline 608. As a result, the fluid in the first chamber 604 cannot be displaced into the first portion 610 of the flowline 608, and the fluid in the second chamber 606 cannot be displaced into the second portion 614 of the flowline 608. Thus, the fluid prevents the piston 602 from moving in the first direction (e.g., toward the first end of the bore 600) and the second direction (e.g., toward the second end of the bore 600). Therefore, when the valve 506 is in the second state, the hydraulic piston assembly 500 substantially locks the first flap 208 in place (i.e., the piston 602 and the arm 308 hold the first flap 208 substantially stationary). Thus, the example apparatus 300 may be employed as a hydraulic lock.

During flight, the fluid in the example apparatus 300 may be subjected to a variety of temperature changes. As a result, a volume and, thus, a pressure of the fluid may increase (e.g., if the temperature rises) or decrease (e.g., if the temperature decreases). In some examples, a portion of the fluid may escape (e.g., via evaporation) from the example apparatus 300, thereby decreasing the pressure of the fluid.

The example accumulator 504 enables the example apparatus 300 to maintain fluid pressures between a lower limit and an upper limit. In the illustrated example, the accumulator 504 is not fluidly coupled to a hydraulic system of the example aircraft 200. In other examples, the accumulator 504 is fluidly coupled to the hydraulic system of the example aircraft 200. Because the first portion 610 of the flowline 608 and the second portion 614 of the flowing are fluidly coupled to the accumulator 504, the accumulator 504 may respond separately to pressure fluctuations (i.e., by providing fluid or receiving fluid) in the first portion 610 of the flowline 608 and the second portion 614 of the flowline 608.

In the illustrated example, the first relief valve 800 (FIG. 8) is substantially identical to the second relief valve 1000 (FIG. 10), and the first check valve 802 is substantially identical to the second check valve 1002. Therefore, a description of the first relief valve 800 and the first check valve 802 can be equally applied to the second relief valve 1000 and the second check valve 1002, respectively. Thus, to avoid redundancy, the second relief valve 1000 and the second check valve 1002 are not separately described.

During operation of the example apparatus 300, the first chamber 604, the flowline 608 and the second chamber 606 are substantially filled with a fluid. When a pressure of the fluid in the first chamber 604 and/or the first portion 610 of the flowline 608 reaches an upper limit due to an increase in the temperature of the fluid, the first relief valve 800 (e.g., a thermal relief valve) opens to enable the fluid in the first chamber 604 and/or the first portion 610 of the flowline 608 to flow into the accumulator 504. However, the first relief valve 800 may not open in response to pressures in the first chamber 604 and/or first portion 610 of the flowline 608 caused by forces applied to the piston 602 by the first flap 208. When the pressure in the first portion 610 of the flowline 608 decreases below a lower limit (e.g., caused by a decrease in the temperature of the fluid and/or a decrease in an amount of the fluid in the first chamber 604 and/or the first portion 610 of the flowline 608), the first check valve 802 opens to enable the fluid from the accumulator 504 to flow into the first portion 610 of the flowline 608 and/or the first chamber 604. Thus, the example apparatus 300 adapts to changes in the temperature of the fluid and/or the amount of the fluid employed by the example apparatus 300 to maintain the fluid pressures in the first portion 610 of the flowline 608 and the second portion 614 of the flowline 608 between the upper limit (e.g., 3000 pounds per square inch) and the lower limit (e.g., 30 pounds per square inch).

In the illustrated example, the first pressure sensor 508 and the second pressure sensor 510 may be used to monitor or test the operation of the example apparatus 300, for example, as part of a pre-flight inspection. The example first pressure sensor 508 determines the pressure of the fluid in the first portion 610 of the flowline 608, and the example second pressure sensor 510 determines the pressure of the fluid in the second portion 614 of the flowline 608. Other examples include pressure sensors to determine pressures in other areas of the example apparatus 300. For example, the first pressure sensor 508 and the second pressure sensor 510 may be used to determine if the pressure in the flowline 608 is sufficient to prevent cavitation of the fluid during operation of the example apparatus 300.

Figure 12:
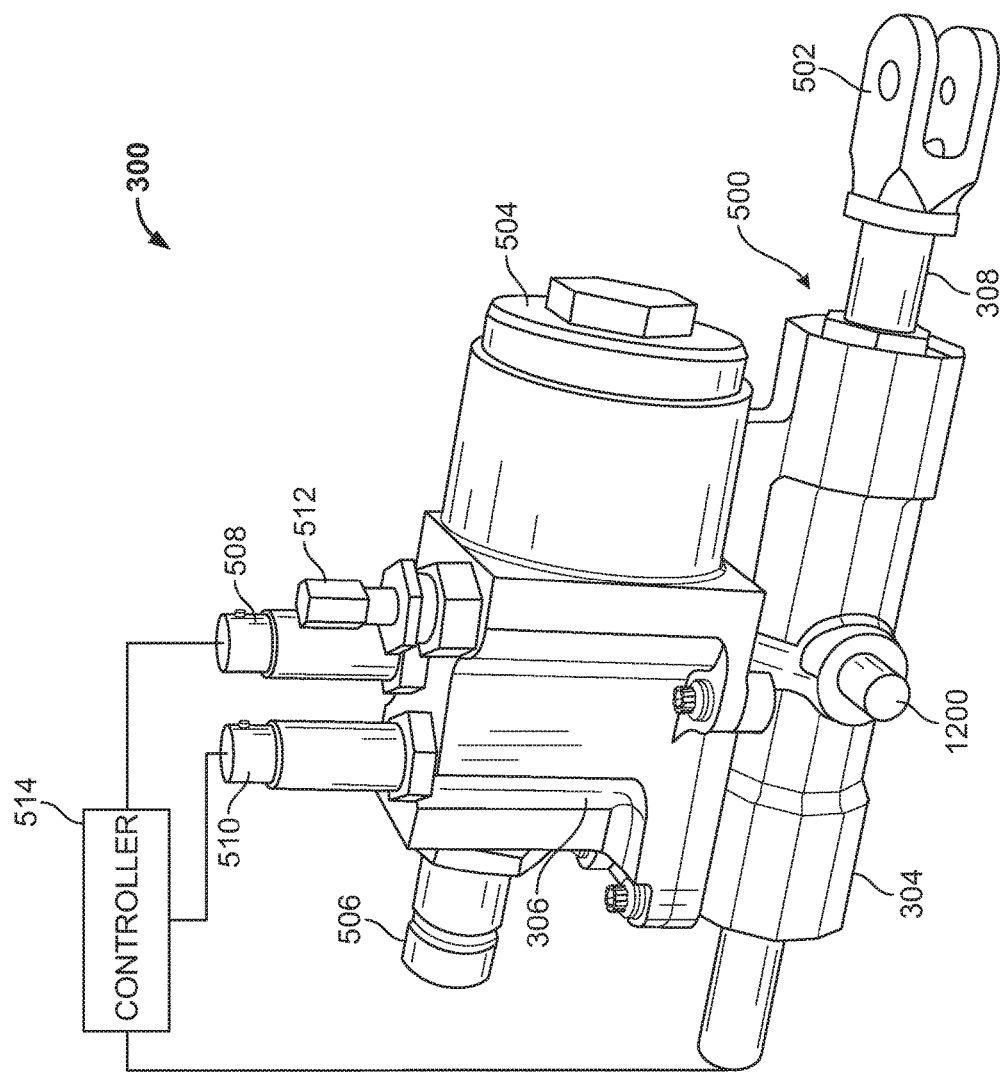
FIG. 12 is a perspective view of the example apparatus of FIG. 5 including an example trunion mount.

FIG. 12 illustrates the example apparatus 300 of FIG. 5 including a trunion mount 1200. In the illustrated example, the first housing 304 includes the trunion mount 1200 to movably couple the example apparatus 300 to a structure such as, for example, the spar 302 of the first wing 204. In some examples, the arm 308 is coupled to a movable component that applies axial loads and side loads to the arm 308 and, thus, the piston 602. When the arm 308 is subjected to the side loads, the example trunion mount 1200 enables the first housing 304 and the second housing 306 to move relative to the structure, thereby reducing an amount of the torque applied to the piston 602.

Figure 13:
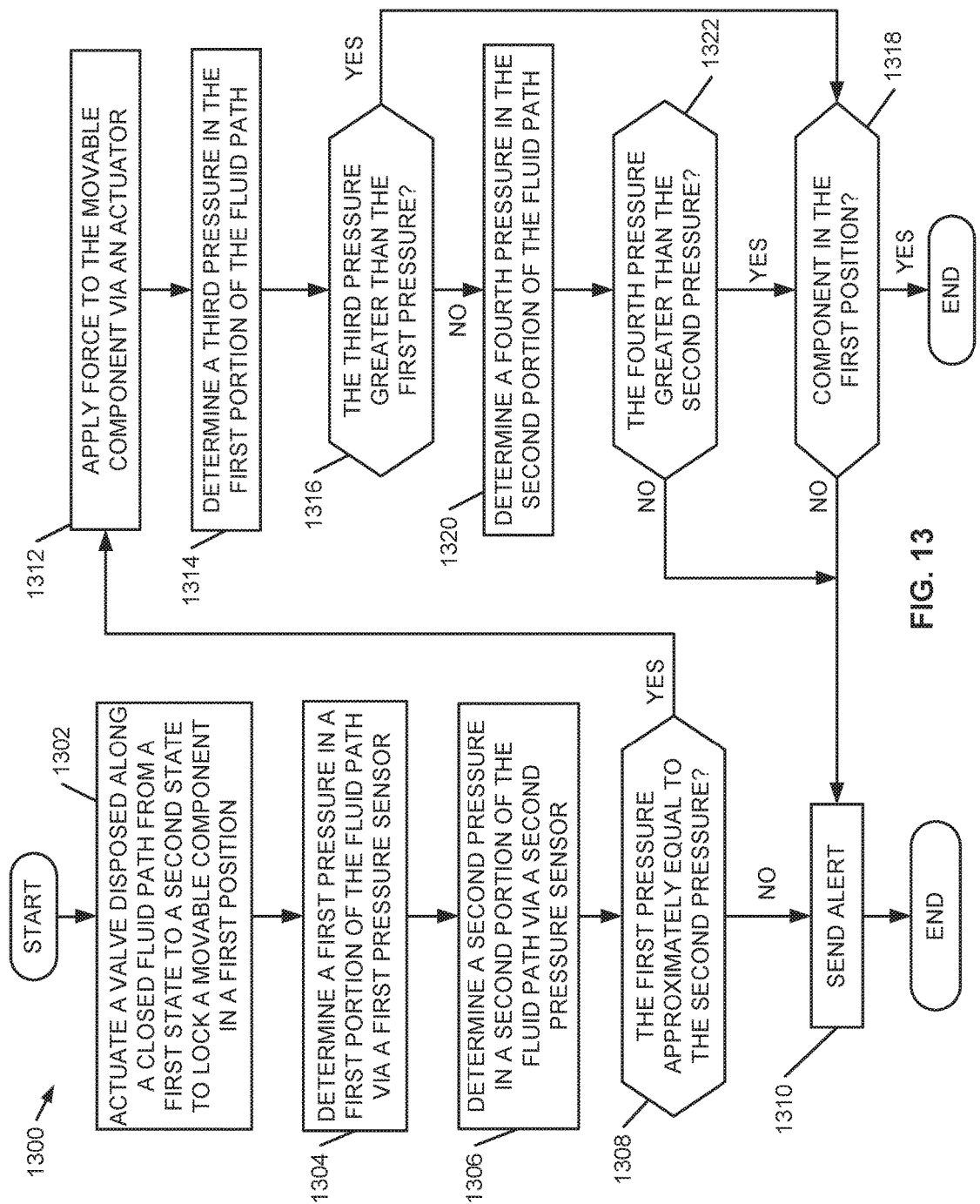
FIG. 13 is a flow chart representative of an example method disclosed herein.

FIG. 13 depicts an example flow diagram representative of methods or processes that may be implemented using, for example, computer readable instructions. The example process of FIG. 13 may be performed using a processor, the controller 514 and/or any other suitable processing device. For example, the example process of FIG. 13 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process of FIG. 13 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example process of FIG. 13 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more operations depicted in FIG. 13 may be implemented manually or as any combination(s) of any of the foregoing techniques, for example, any combination of firmware, software, discrete logic and/or hardware.

Further, although the example process of FIG. 13 is described with reference to the flow diagram of FIG. 13, other methods of implementing the process of FIG. 13 may be employed. For example, the order of execution of the blocks may be changed, and/or some of the blocks described may be changed, eliminated, sub-divided, or combined. Additionally, one or more of the operations depicted in FIG. 13 may be performed sequentially and/or in parallel by, for example, separate processing threads, processors, devices, discrete logic, circuits, etc.

FIG. 13 is a flowchart representative of an example method 1300 that can be performed to determine if a movable component is locked in place by a hydraulic lock such as, for example, the example apparatus 300 of FIGS. 3-12. With reference to FIGS. 3-12, the example method of FIG. 13 begins at block 1302 by actuating the valve 506 disposed along a closed fluid path (e.g., the first chamber 604, the flowline 608 and the second chamber 606) from a first state to a second state to lock a movable component in a first position. At block 1304, the controller 514 determines a first pressure in the first portion 610 of the fluid path via the first pressure sensor 508. At block 1306, the controller 514 determines a second pressure in the second portion 614 of the fluid path via a second pressure sensor 510.

At block 1308, the controller 514 determines if the first pressure is approximately equal to the second pressure. If the first pressure is not approximately equal to the second pressure, the example controller 514 sends an alert (e.g., to be displayed via a cockpit display in the example aircraft 200 of FIG. 2) (block 1310). At block 1312, a force is applied to the component (e.g., the first flap 208) via an actuator (e.g., a hinge line rotary actuator). While the force is being applied, the first pressure sensor 508 determines a third pressure in the first portion 610 of the fluid path (block 1314). At block 1316, the controller 514 determines if the third pressure is greater than the first pressure. When the force is applied to the piston 602 by the component in a first direction (e.g., the component is pushing the piston 602) and the valve 506 is preventing fluid from flowing past the valve 506, the pressure in the first portion 610 of the fluid path increases. If the third pressure is greater than the first pressure, the controller 514 determines if the component is in the first position (block 1318). In some examples, a position sensor (e.g., an accelerometer) is operatively coupled to the component to determine a position of the component. If the component is in the first position, the component is locked in place, and the example method ends. If the component is not in the first position, an alert is sent (block 1310).

If the third pressure is not greater than the first pressure, the second pressure sensor 510 determines a fourth pressure in the second portion 614 of the fluid path while the force is being applied (block 1320). When the force is applied to the piston 602 by the component in a second direction (e.g., the component is pulling the piston 602) and the valve 506 is preventing fluid from flowing past the valve 506, the pressure in the second portion 614 of the fluid path increases. If the controller 514 determines that the fourth pressure not greater than the second pressure, an alert is sent (block 1310). If the controller 514 determines the fourth pressure is greater than second pressure, the controller 514 determines if the component is the first position (block 1318). If the component is in the first position, the component is locked in place, and the example method ends. If the component is not in the first position, an alert is sent (block 1310).

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. A method comprising:
   determining a first pressure in a first portion of a fluid flowline of a damper while a valve of the damper is in a closed state, the damper coupled to a movable component of an aircraft, the damper including a housing and a piston disposed in a bore of the housing such that the bore forms a first chamber and a second chamber, wherein a closed fluid path is formed by the first chamber, the fluid flowline, and the second chamber, and wherein the closed fluid path only receives fluid from an accumulator and is not fluidly coupled to a hydraulic system of the aircraft;
   actuating an actuator coupled to the movable component to apply a force to the movable component while the valve is in the closed state;
   determining a second pressure in the first portion while the force is applied to the movable component and the valve is in the closed state;
   determining whether the second pressure is approximately equal to the first pressure; and
   in response to determining the second pressure is approximately equal to the first pressure, generating a first alert.

2. The method of claim 1, wherein the movable component is in a first position while the first pressure is determined.

3. The method of claim 2 further including, in response to determining the second pressure is not approximately equal to the first pressure, determining whether the movable component is in the first position.

4. The method of claim 3 further including, in response to determining the movable component is not in the first position, generating a second alert.

5. The method of claim 3, wherein the determining of whether the movable component is in the first position includes detecting a position of the movable component via a position sensor.

6. The method of claim 5, wherein the position sensor is an accelerometer.

7. The method of claim 1, wherein the first alert is a display in a cockpit of the aircraft.

8. The method of claim 1 further including determining, prior to actuating the actuator, a third pressure in a second portion of the fluid flowline.

9. The method of claim 8 further including generating a second alert when the third pressure is not approximately equal to the first pressure.

10. The method of claim 8 further including determining a fourth pressure in the second portion of the fluid flowline while the force is applied to the movable component.

11. The method of claim 10 further including generating a second alert when the fourth pressure is approximately equal to the third pressure.

12. The method of claim 1 further including actuating, prior to determining the first pressure, the valve from an open state to the closed state.

13. An apparatus comprising:
a damper coupled to a movable component of an aircraft, the damper including:
a housing defining a bore;
a piston disposed in the bore such that the bore defines a first chamber and a second chamber;
a fluid flowline coupled between the first chamber and the second chamber, a closed fluid path formed by the first chamber, the fluid flowline, and the second chamber;
a valve disposed along the fluid flowline; and
an accumulator fluidly coupled to the fluid flowline, the fluid flowline only receiving fluid from the accumulator and not being fluidly coupled to a hydraulic system of the aircraft;
an actuator coupled to the movable component; and
a controller to:
determine a first pressure in a first portion of the fluid flowline while the valve is in a closed state;
determine a second pressure in the first portion while the actuator applies a force to the movable component and the valve is in the closed state;
determine whether the second pressure is approximately equal to the first pressure; and
in response to determining the second pressure is approximately equal to the first pressure, generate a first alert.

14. The apparatus of claim 13 further including a position sensor to detect a position of the movable component when the force is applied by the actuator.

15. The apparatus of claim 14, wherein the controller is to generate a second alert when (1) the second pressure is not approximately equal to the first pressure and (2) the movable component is not in a same position as prior to applying the force.

16. The apparatus of claim 13, wherein the first alert is a display in a cockpit of the aircraft.

17. A method comprising:
actuating a valve disposed in a fluid flowline of a damper from an open state to a closed state, the valve dividing the fluid flowline into a first portion and a second portion, the damper coupled to a movable component of an aircraft, wherein the damper has a closed fluid path formed by the fluid flowline, wherein the closed fluid path only receives fluid from an accumulator and is not fluidly coupled to a hydraulic system of the aircraft;
determining a first pressure in the first portion and a second pressure in the second portion;
determining whether the first pressure is approximately equal to the second pressure; and
in response to determine the first pressure is not approximately equal to the second pressure, generating a first alert.

18. The method of claim 17 further including, in response to determining the second pressure is approximately equal to the first pressure, actuating an actuator coupled to the movable component to apply a force to the movable component.

19. The method of claim 18 further including:
determining a third pressure in the first portion while the force is applied to the movable component; and
generating a second alert when the third pressure is approximately equal to the first pressure.

20. The method of claim 17, wherein the first alert is a display in a cockpit of the aircraft.

* * * * *